United States Patent
Casse et al.

(10) Patent No.: US 9,751,620 B2
(45) Date of Patent: Sep. 5, 2017

(54) AIRCRAFT HAVING LANDING GEAR DOORS AND A SYSTEM FOR MANEUVERING THE DOORS

(71) Applicant: AIRBUS OPERATIONS (S.A.S.), Toulouse (FR)

(72) Inventors: Christophe Casse, Fenouillet (FR); Didier Reynes, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 24 days.

(21) Appl. No.: 14/847,255

(22) Filed: Sep. 8, 2015

(65) Prior Publication Data

US 2016/0068262 A1    Mar. 10, 2016

(30) Foreign Application Priority Data

Sep. 5, 2014 (FR) ...................................... 14 58318

(51) Int. Cl.
*B64C 25/16* (2006.01)
*B64C 1/14* (2006.01)

(52) U.S. Cl.
CPC ............ *B64C 25/16* (2013.01); *B64C 1/1407* (2013.01)

(58) Field of Classification Search
CPC ......... B64C 1/14; B64C 1/1407; B64C 25/16; B64D 1/02; B64D 1/06
See application file for complete search history.

(56) References Cited

U.S. PATENT DOCUMENTS

| | | | | |
|---|---|---|---|---|
| 2,281,471 A | * | 4/1942 | Baum | B64D 1/06 212/307 |
| 2,371,699 A | | 3/1945 | Martin | |
| 2,452,251 A | * | 10/1948 | Martin | B64C 25/16 244/102 R |
| 2,538,980 A | * | 1/1951 | Payne, Jr. | B64C 25/16 292/196 |
| 2,604,281 A | | 7/1952 | Buchal et al. | |
| 4,412,665 A | * | 11/1983 | Kramer | B64C 25/12 244/102 R |
| 5,065,961 A | * | 11/1991 | Ellis | B64D 1/06 244/137.4 |
| 5,088,664 A | * | 2/1992 | Ellis | B64D 1/06 244/137.4 |

(Continued)

FOREIGN PATENT DOCUMENTS

WO    2011/000971    1/2011

OTHER PUBLICATIONS

International Preliminary Report on Patentability cited in FR 1458318, completed Apr. 30, 2015, six pages.

*Primary Examiner* — Joseph W Sanderson
(74) *Attorney, Agent, or Firm* — Nixon & Vanderhye P.C.

(57) ABSTRACT

An aircraft with a landing gear, a compartment to stow the landing gear and doors for the compartment movable between an open position and a closed position. The movement of the doors is controlled by a maneuvering system having two transmission chains or linkages each connecting one of the doors to an actuation member that includes a rotatable arm and an actuating cylinder. Each transmission chain or linkage has a relay element mounted pivotably on a structural element of the aircraft, a first connection element between the arm and the relay element, and a second connection element between the door and the relay element.

21 Claims, 5 Drawing Sheets

(56) References Cited

U.S. PATENT DOCUMENTS

| | | | | |
|---|---|---|---|---|
| 5,092,542 | A * | 3/1992 | Ellis | B64D 1/06 244/137.4 |
| 5,482,228 | A | 1/1996 | Hoshino | |
| 6,098,925 | A * | 8/2000 | Burdsall, II | B64D 1/06 244/118.1 |
| 7,338,012 | B2 * | 3/2008 | Rouyre | B64C 25/16 244/102 A |
| 7,677,497 | B2 * | 3/2010 | Santos Rubio | B64D 1/06 244/129.4 |
| 8,074,930 | B2 * | 12/2011 | Sibley | B64C 1/1407 244/102 R |
| 8,167,241 | B2 * | 5/2012 | Reynes | B64C 25/16 244/102 A |
| 8,231,078 | B2 * | 7/2012 | Amberg | B64C 25/16 244/102 A |
| 2006/0157621 | A1 * | 7/2006 | Santos Rubio | B64D 1/06 244/129.4 |
| 2009/0127389 | A1 * | 5/2009 | Reynes | B64C 25/16 244/102 A |
| 2009/0314893 | A1 * | 12/2009 | Lugaro | B64D 1/06 244/129.5 |
| 2010/0019089 | A1 * | 1/2010 | Sibley | B64C 1/1407 244/129.5 |
| 2010/0140395 | A1 * | 6/2010 | Amberg | B64C 25/20 244/102 R |
| 2012/0168562 | A1 * | 7/2012 | Alonzo | B64C 25/16 244/102 A |
| 2015/0166173 | A1 * | 6/2015 | Reynes | B64C 25/20 244/129.5 |
| 2015/0307185 | A1 * | 10/2015 | Reynes | B64C 25/16 244/102 R |

* cited by examiner

FIG. 10B

AIRCRAFT HAVING LANDING GEAR DOORS AND A SYSTEM FOR MANEUVERING THE DOORS

RELATED APPLICATION

This application claims priority to French patent application 1458318 filed Sep. 5, 2014, the entirety of which is incorporated by reference.

FIELD OF INVENTION

The present invention relates to landing gear doors on an aircraft and systems to maneuver the doors.

BACKGROUND

An aircraft usually has two main landing gears. Each main landing gear has a strut and a set of tires fixed to the strut. Each main landing gear is retracted in a compartment behind a door(s) in the fuselage of the aircraft.

As the aircraft executes a landing procedure, each door opens to allow the associated main landing gear to deploy. The doors close while the main landing gear remains deployed. Each door is mounted to be movable in rotation on the structure of the aircraft and is displaced by its own actuation means, which is generally formed by an actuating cylinder. The aircraft has two actuating cylinders, which each must be controlled independently to control the opening and the closing of each door. Systems for maneuvering the doors are structurally complex and difficult to manage. These systems have significant mass which is a disadvantage for aircraft.

SUMMARY OF THE INVENTION

An invention has been conceived and is disclosed herein for landing gear doors and a system to maneuver the doors. An aircraft has a first door and a second door for the main landing gear. Each door is movable between an open position and a closed position by means of a maneuvering system having an actuation member and two transmission chains, e.g., linkages, each connecting one of the doors to the actuation member. The actuation member includes an arm mounted pivotably on a first structural element of the aircraft and an actuating cylinder mounted on a second structural element of the aircraft. The actuating cylinder acts on the arm to cause the rotation thereof.

Each transmission chain as a relay element mounted pivotably on a structural element of the aircraft, a first connection element between the arm and the relay element and a second connection element between the door and the relay element. The maneuvering system opens and closes the two doors simultaneously. This results in a system for maneuvering two doors that is simplified, less bulky, and lighter than a conventional maneuvering system having two actuation members and all the associated additional parts.

Features that may be included in embodiments of the invention include: The actuation member has an arm and an actuating cylinder provided solely to maneuver the doors. The transmission chains may be are aligned with a longitudinal axis of the aircraft. The doors are disposed for the closed position in the continuation of the skin of the aircraft fuselage, and for the open position the doors are folded inside a compartment of the aircraft. Each of the two doors is movable in rotation to pass from the closed position into the open position. The actuating cylinder is mounted pivotably on the second structural element of the aircraft, and the arm and actuating cylinder are being connected in an articulated manner at a connection zone, each first connection element being connected to the arm at the connection zone.

Other features that may be included in embodiments of the invention include: the first structural element and the second structural element are to be selected from a lower platform and an upper platform of the aircraft. The arm has a first end mounted pivotably on the first structural element of the aircraft and the actuating cylinder has a first end mounted pivotably on the second structural element of the aircraft, a second end of the arm being connected in an articulated manner to a second end of the actuating cylinder at the connection zone.

Additional features of embodiments of the invention may include: The first end of the arm is splayed and the second end of the arm is narrowed. The pivotable arm has two longitudinal segments, which are not parallel, connected to one another by a transverse segment, the first, splayed end corresponding to a maximum spacing of the longitudinal segments and the second, narrowed end corresponding to a minimal spacing thereof.

Further features of embodiments of the invention may include: the first end of the arm and the first end of the actuating cylinder are each mounted pivotably, respectively, on the first structural element and the second structural element of the aircraft about an axis of rotation that is parallel to a transverse axis of the aircraft, the articulation of the connection zone being formed about an axis that is parallel to a transverse axis of the aircraft. The different movements of the pivotable arm and of the actuating cylinder are performed in a vertical and longitudinal plane of the aircraft. The term "parallel" is to be interpreted with a tolerance of substantially 10°.

Additional features that may be included in embodiments of the invention include: The relay element is a rigid part, mounted pivotably about an axis that is parallel to a longitudinal axis of the aircraft, the first connection element and the second connection element each being formed by a connecting rod. Each of the two doors is connected to a supporting part, which is mounted pivotably on a structural element of the aircraft to allow the door to pivot between the open position and the closed position, the second connection element connecting the supporting part to the relay element. At least the first or the second connection element forms a force-limiting means for each transmission chain. The force-limiting means may be formed by a resilient connecting rod. Each resilient connecting rod may connect a first element to a second element. Each resilient connecting rod comprising a jacket connected to the first element or to the second element, a rod connected to the other element, and a spring forcing the rod to the bottom of the jacket, wherein the rod only being displaced in the jacket beyond a normal force for maneuvering the doors.

Additional features that may be included in embodiments of the invention include: The first door and the second door are able to close a compartment of the aircraft that is designed for the storage of two main landing gears. The first door and the second door are separated by a fixed panel of the aircraft, and the doors are disposed in continuity with the panel when they are disposed in a closed position.

SUMMARY OF THE DRAWINGS

A detailed description of a number of possible variants of an aircraft according to the invention will be given hereinafter with reference to the Figures described below.

DETAILED DESCRIPTION OF THE INVENTION

With reference to FIGS. 1, 2, 5 and 6, an aircraft 1, 100, 200 has two main landing gears and a compartment 2 to stow the main landing gears. The compartment 2 has two doors 5, 6 movable in rotation between an open position and a closed position. The movement of these doors is controlled by a maneuvering system having two transmission chains, such as linkages, each connecting one of the doors 5, 6 to an actuation member comprising a rotatable arm 7 and an actuating cylinder 8.

Each transmission chain includes a relay element 17 mounted pivotably on a structural element, e.g., a lower platform, 3 of the aircraft 1, 100, 200, a first connection element (rod) 18 between the arm 7 and the relay element 17, and a second connection element (rod) 19 between the door 5, 6 and the relay element 17.

The main landing gears are controlled to move from a position stowed in the compartment 2 within the aircraft 1 to a deployed position at which the landing extends below the aircraft so that the wheels of the landing gear engage the runway during landing of the aircraft. The compartment 2 has a lower platform 3 and an upper platform 4. Each platform 3, 4 extends along a longitudinal axis of the aircraft 1. The compartment 2 is closed when the doors 5, 6 of the compartment are shut. The doors may be connected to the fuselage by hinges about which the doors pivot between closed and open positions.

When the doors are closed, the outer surface of the doors are flush with the skin of the fuselage. When open, the doors allow the main landing gear move from a stowed position in a compartment of the aircraft to a deployed position ready for landing. The doors 5, 6 are located on the underside of the fuselage of the aircraft 1. When opened, the doors 5, 6 may be folded and retracted inside the compartment.

The movement of the two doors 5, 6 is managed by a maneuvering system having two transmission chains and a sole actuation member, which is common for the functioning of the two doors 5, 6. Each transmission chain connects one of the two doors 5, 6 to the common actuation member and makes it possible to communicate the movement of the member to each of the doors 5, 6 in order to cause the doors to open or close. The common actuation member comprises a pivotable arm 7 and a pneumatic, hydraulic or electric actuating cylinder 8 connected to one another in an articulated manner. For example, the actuating cylinder may include a pneumatic or hydraulic reservoir and a piston moved by pneumatic or hydraulic fluid in the reservoir, wherein the piston is connected to an extendable end of the actuating cylinder. Alternatively, the actuating cylinder may be a telescoping cylinder (hollow or solid) including an electric motor that extends and retracts the cylinder.

With reference to FIGS. 2 to 4B, the actuation member comprises a pivotable arm 7 mounted rotatably on the lower platform 3 of the compartment 2 and an actuating cylinder 8 mounted rotatably on the upper platform 4 of the compartment 2. The pivotable arm 7 is elongate and comprises two tubular longitudinal segments 9, 10, which are not parallel, and a transverse segment 11 connecting the two longitudinal segments 9, 10. In this way the arm 7 has a first, splayed end 12, for which the spacing between the two longitudinal segments 9, 10 is maximal, and a second, narrowed end, for which the spacing between the two longitudinal segments 9, 10 is minimal. The arm 7 is mounted pivotably at the first, splayed end 12 thereof on the lower platform 3, about a horizontal axis of rotation, connected to the platform 3 and extending parallel to a transverse axis of the aircraft 1. This axis joins the two longitudinal segments 9, 10 of the arm 7 at the first, splayed end 12. The arm 7 is thus able to pivot in a longitudinal plane of the aircraft 1, which may be vertical or inclined with respect to a vertical plane. The actuating cylinder 8 is elongate and has a first end 14 connected pivotably to the upper platform 4, about a horizontal axis of rotation extending substantially parallel to a transverse axis of the aircraft 1. The actuating cylinder 8 is thus able to pivot in a longitudinal plane of the aircraft 1, which may be vertical or inclined with respect to a vertical plane. The actuating cylinder 8 has a second end connected in an articulated manner to the second, narrowed end of the pivotable arm 7 to form a connection zone, e.g., a connection plate, 16. The articulation is provided about a horizontal axis of rotation extending in a transverse direction of the aircraft 1. The arm 7 and the actuating cylinder 8 extend from the first ends 12, 14 thereof towards the front of the aircraft 1. In this way, the connection zone 16 between the arm 7 and the actuating cylinder 8 is located in front of the first ends 12, 14 of the arm 7 and of the actuating cylinder 8. It is important to emphasize that the fixing of the arm 7 at the first end 12 thereof on the lower platform 3, and also the fixing of the actuating cylinder 8 at the first end 14 thereof on the upper platform 4 are fixings that cannot be displaced along the platforms 3, 4.

Each transmission chain is similar for each door 5, 6 and includes a rigid relay arm 17, mounted pivotably to the lower platform 3 and in front of the first, splayed end 12 of the arm 7. This relay arm 17 is mounted to the lower platform 3 to rotate about a horizontal axis parallel to a longitudinal axis of the aircraft 1. The relay arm 17 pivots in a vertical and transverse plane of the aircraft 1. This relay arm 17 has a first end, connected in an articulated manner to the lower platform 3, and a second end, to which a first connecting element, e.g., rod 18 and a second connecting element, e.g., rod 19 are fixed pivotably, each of the connecting elements (rods) 18, 19 being shown by a rigid tubular rod. The first connecting element 18 connects the relay arm 17 to the second end of the arm 7 located in the connection zone 16, and the second connecting element (rod) 19 connects the relay arm 17 to a supporting part 20 that is either connected to or part of the door 5, 6. The connection between the first connecting element (rod) 18 and the second end of the arm 7 is articulated, as is also the connection between the second connecting element (rod) 19 and the supporting part 20. The door 5, 6 is connected to or part of the supporting part 20, which is in turn mounted pivotably on the lower platform 3, about an axis of rotation that is parallel to a longitudinal axis of the aircraft 1. More precisely, each supporting part 20 is mounted pivotably at a lower end of a protrusion 21 which is connected to the lower platform 3. In this way, the supporting part 20 is located to the right of the relay arm 17 and therebelow. The articulated connection between the second connecting element (rod) 19 and the supporting part 20 is distant from the axis of rotation of the supporting part 20 on the protrusion 21 of the lower platform 3.

Figure 1:
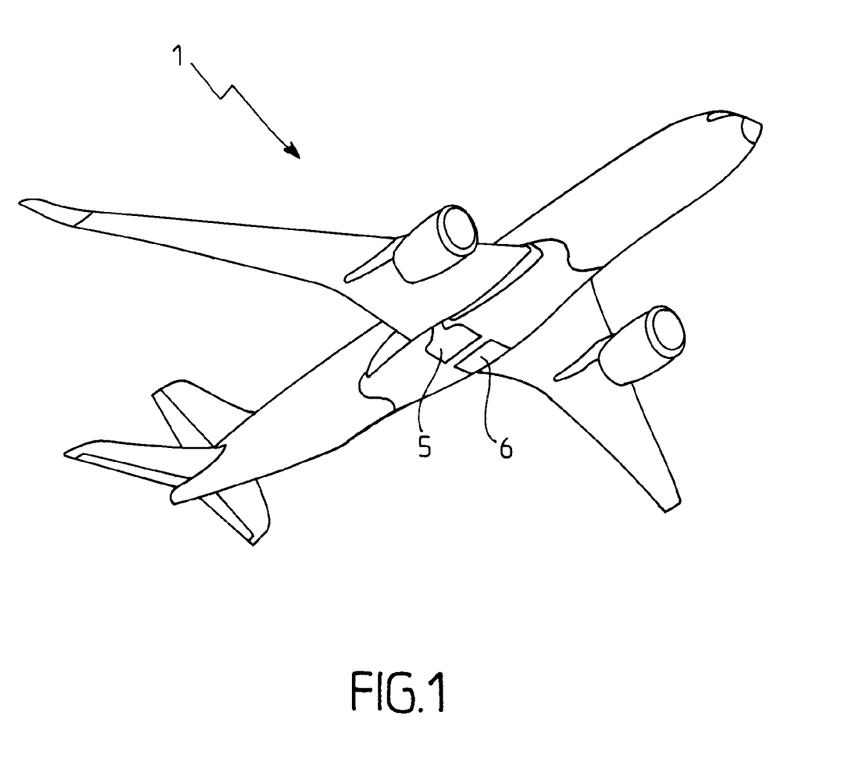
FIG. 1 is a general perspective view of an aircraft.
Figure 2:
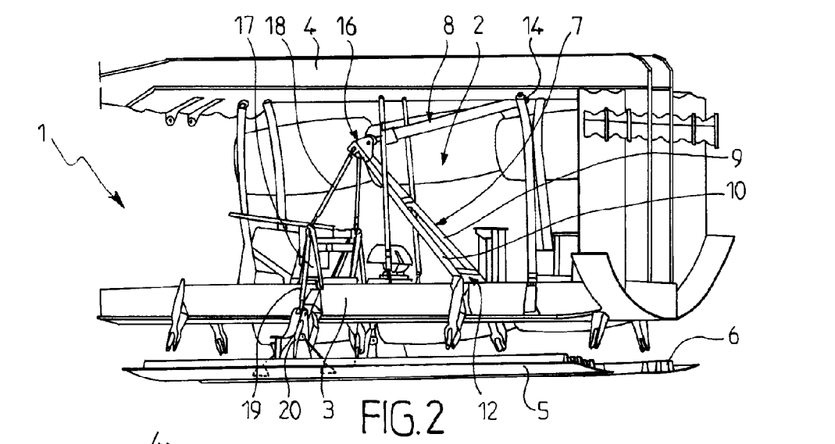
FIG. 2 is a perspective view of an internal structure of the aircraft and illustrates doors for opening and closing a compartment for the deployment and retraction of main landing gears.
Figure 3A:
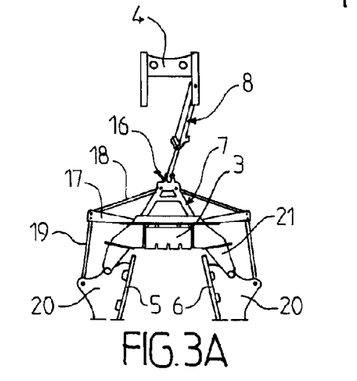
FIG. 3A is a simplified sectional view, along a plane perpendicular to the longitudinal axis of the aircraft, of the internal structure illustrated in FIG. 2 and for which the two doors are in the open position.
Figure 3B:
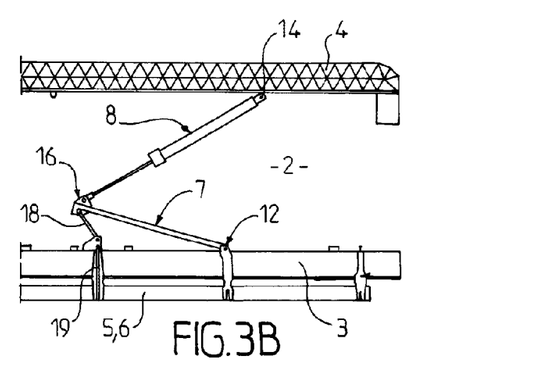
FIG. 3B is a simplified sectional view, along a plane parallel to the longitudinal axis of the aircraft, of the internal structure of FIG. 3A.

FIGS. 3A and 3B illustrate the two doors 5, 6 in an open position within the compartment 2. The actuating cylinder 8 is deployed and holds the connection zone 16 between the actuating cylinder 8 and the pivotable arm 7, in a low position, simultaneously causing the doors 5, 6 to open via the first connecting elements (rods) 18, the second connecting elements (rods) 19 and the relay arms 17. In this open position, the two doors 5, 6 extend in a substantially vertical and longitudinal plane of the aircraft 1. It should be noted that the relay arms 17 extend in a substantially horizontal plane when the two doors 5, 6 are open.

Figure 4A:
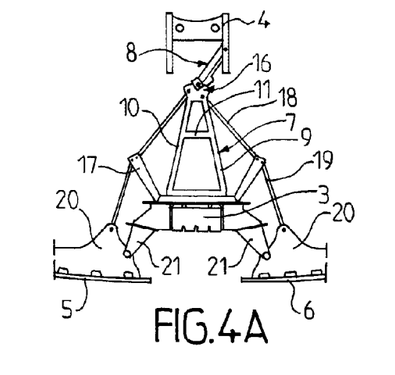
FIG. 4A is a simplified sectional view, along a plane perpendicular to the longitudinal axis of the aircraft, of the internal structure illustrated in FIG. 2 and for which the two doors are in the closed position.
Figure 4B:
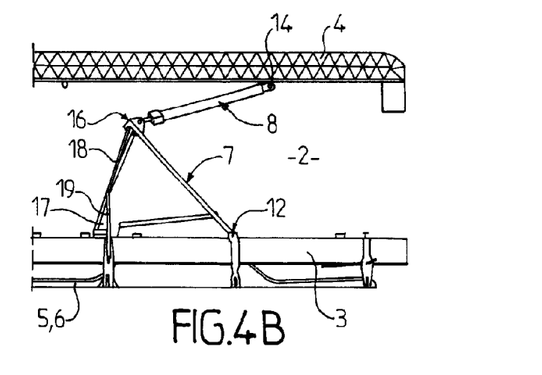
FIG. 4B is a simplified sectional view, along a plane parallel to the longitudinal axis of the aircraft, of the internal structure of FIG. 4A.

To pass from the open position of the doors 5, 6 to the closed position illustrated in FIGS. 4A and 4B, the actuating cylinder 8 is controlled such that the length thereof decreases. This decrease of length automatically drives the rotation of the pivotable arm 7 about the first end 12 thereof, in the direction of ascent of the arm 7. The connection zone 16 is then raised, simultaneously driving an upward rotation of the two relay arms 17 via the first connecting elements (rods) 18 and the pivoting of the supporting parts 20 via the second connecting elements (rods) 19. All the parts involved in the maneuvering system, i.e. the first and second connecting elements (rods) 18, 19, the relay arms 17, the actuating cylinder 8 and the pivotable arm 7, are dimensioned and arranged with one another such that the two doors 5, 6 are disposed in a substantially horizontal plane when they are in a position closing the compartment 2. In fact, in this closed position, the two doors 5, 6 must ensure perfect continuity with the skin of the aircraft 1, without introducing any height difference therewith. It should be noted that the two doors 5, 6 are separated from one another by a panel (not visible in FIG. 4A) of the skin of the aircraft 1 when the doors are closed. From this closed position, it is suffice to control the actuating cylinder 8 in the reverse direction, i.e., to increase the length thereof, in order to cause the doors 5, 6 to open.

Figure 5:
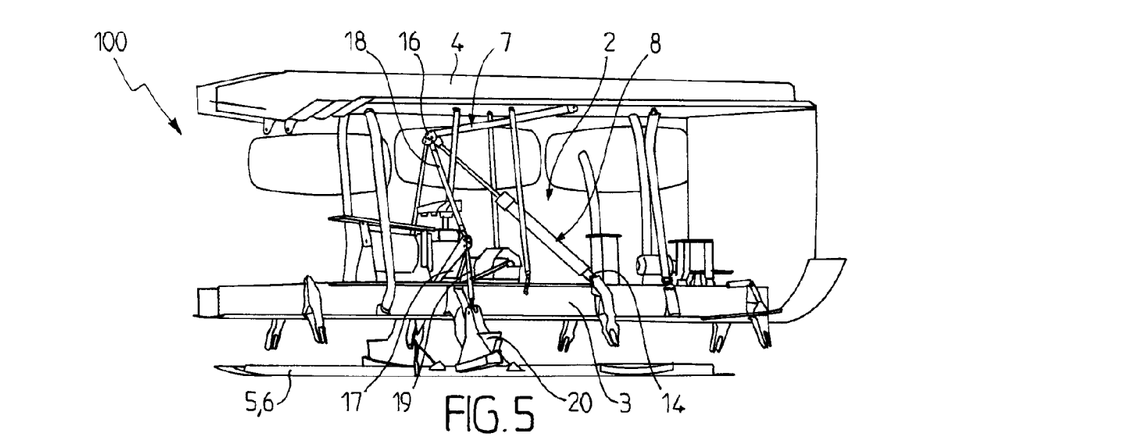
FIG. 5 is a perspective view of an internal structure of a second embodiment of the invention, illustrating two doors for opening and closing a compartment for the deployment and retraction of main landing gears.

With reference to FIG. 5, a second possible embodiment of an aircraft 100 according to the invention differs from the first embodiment described above in that the fixings of the arm 7 and of the actuating cylinder 8 on the upper and lower platforms 3, 4 are reversed. In fact, for this second embodiment, the arm 7 is fixed rotatably to the upper platform 4 whereas the actuating cylinder is mounted rotatably on the lower platform 3. All the other elements involved in the first embodiment remain unchanged for this second embodiment. Similarly to the first embodiment, the arm 7 and the actuating cylinder 8 extend from their first ends 12, 14 towards the front of the aircraft 1. In this way, the connection zone 16 between the arm 7 and the actuating cylinder 8 is located in front of the first ends 12, 14 of the arm 7 and of the actuating cylinder 8. It is important to emphasize that the fixing of the arm 7 at the first end 12 thereof to the upper platform 4, as well as the fixing of the actuating cylinder 8 at the first end 14 thereof to the lower platform are fixings that cannot be displaced along the platforms 3, 4. The functioning of this second embodiment is identical to that of the previously described first embodiment.

The lengthening or the shortening of the actuating cylinder 8 causes the rotation of the pivotable arm 7 in one direction or the other, driving an ascent or a descent of the connection zone 16 and therefore a closing or an opening of the two doors 5, 6 via the transmission chains.

With reference to FIGS. 6 to 8B, a third possible embodiment of an aircraft 200 according to the invention differs from the two previously described embodiments in that the pivotable arm 7 and the actuating cylinder 8 are both fixed rotatably to the lower platform 3. All the other elements involved in the two previously described embodiments remain unchanged for this third embodiment.

Figure 6:
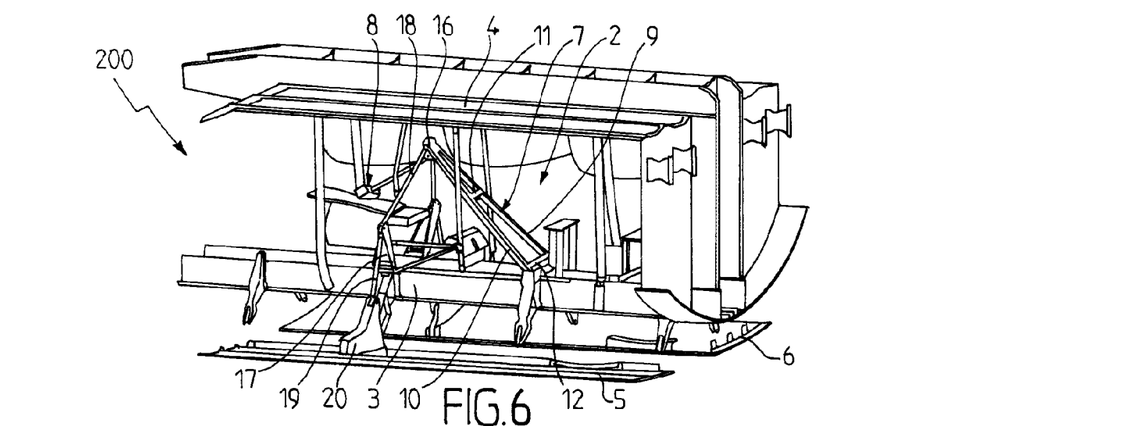
FIG. 6 is a perspective view of an internal structure of a third embodiment of the invention, illustrating two doors for opening and closing a compartment for the deployment and retraction of main landing gears.
Figure 7A:
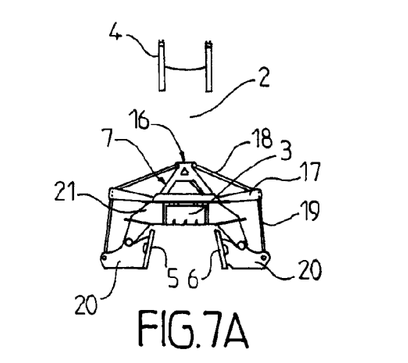
FIG. 7A is a simplified sectional view, along a plane perpendicular to the longitudinal axis of the aircraft, of the internal structure illustrated in FIG. 6 and for which the doors are in the open position.
Figure 7B:
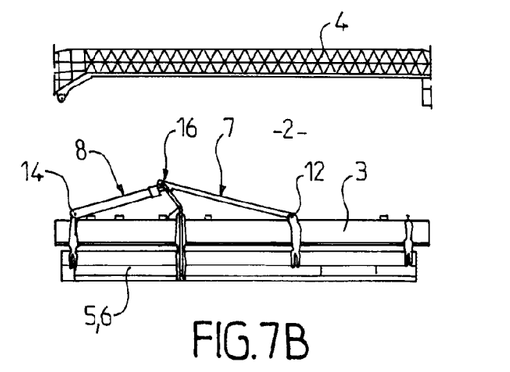
FIG. 7B is a simplified sectional view, along a plane parallel to the longitudinal axis of the aircraft, of the internal structure of FIG. 7A.
Figure 8A:
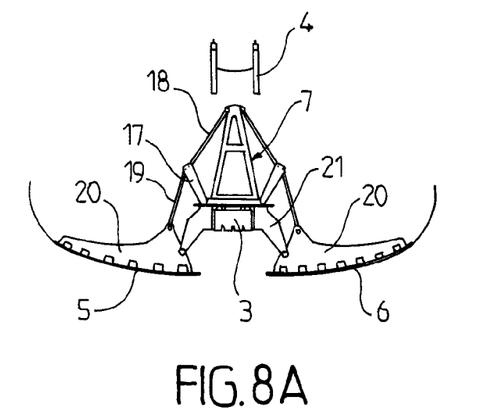
FIG. 8A is a simplified sectional view, along a plane perpendicular to the longitudinal axis of the aircraft, of the internal structure illustrated in FIG. 6 and for which the two doors are in the closed position.
Figure 8B:
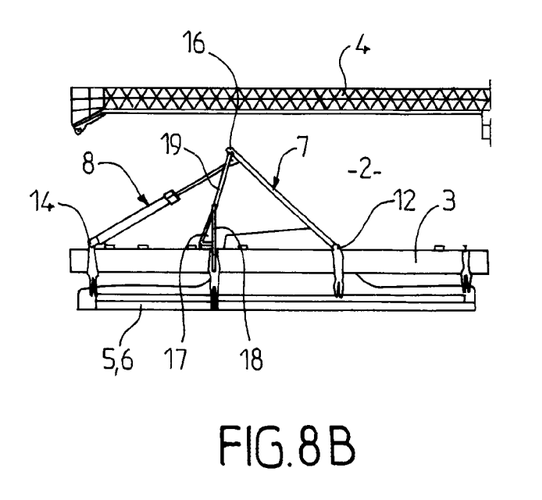
FIG. 8B is a simplified sectional view, along a plane parallel to the longitudinal axis of the aircraft, of the internal structure of FIG. 8A.

As shown by the three FIGS. 6, 7B and 8B, the arm 7 extends from its first end 12 connected to the lower platform 3 towards the front of the aircraft 200, and the actuating cylinder 8 extends from its first end 14 towards the rear of the aircraft 200 connected to the lower platform 3. In this way, the connection zone 16 between the actuating cylinder 8 and the pivotable arm 7 is disposed to the right and above a grouping zone of the lower platform 3, combining the two relay arms 17, the first and second connecting elements (rods) 18, 19 and the two protrusions 21 on which the supporting parts 20 of the two doors 5, 6 are mounted. In other words the first end 14 of the actuating cylinder 8 is disposed at the front of this grouping zone, and the first end 12 of the pivotable arm 7 is disposed at the rear of the grouping zone.

With reference to FIGS. 7A and 7B, when the actuating cylinder 8 is retracted, the connection zone 16 between the pivotable arm 7 and the actuating cylinder 8 is lowered, causing the two doors 5, 6 to open by means of the two transmission chains.

With reference to FIGS. 8A and 8B, when the actuating cylinder 8 is deployed, increasing the length thereof, it causes the arm 7 to pivot upwardly, driving an ascent of the connection zone 16. This ascent causes the two doors 5, 6 to close via the two transmission chains.

Although not shown in the figures, a fourth possible embodiment of an aircraft according to the invention would implement a pivotable arm 7 and an actuating cylinder 8 both fixed to the lower platform 3, but in reversed positions relative to those of the third embodiment 200 described above. In other words, for this configuration, the arm 7 would extend towards the rear of the aircraft, and the actuating cylinder 8 would extend towards the front. The first end 12 of the arm 7 would then be situated in front of the grouping zone, and the first end 14 of the actuating cylinder 8 would be situated to the rear of the zone, such that the connection zone 16 is situated above and to the right of the grouping zone.

Other embodiments of an aircraft according to the invention, for which the pivotable arm 7 and the actuating cylinder 8 would both be fixed to the upper platform 4, on each side of the grouping zone. The arm 7 could then be placed in front of the actuating cylinder 8, or could be disposed therebehind, the only requirement being that the connection zone 16 is disposed above and to the right of the grouping zone. Whatever the possible embodiments of an aircraft 1, 100, 200 according to the invention, the arm 7 and the actuating cylinder 8 are displaced in the same longitudinal and vertical plane of the aircraft 1, 100, 200, and the doors 5, 6 pivot about an axis of rotation that is parallel to a longitudinal axis of the aircraft 1, 100, 200.

Figure 9:
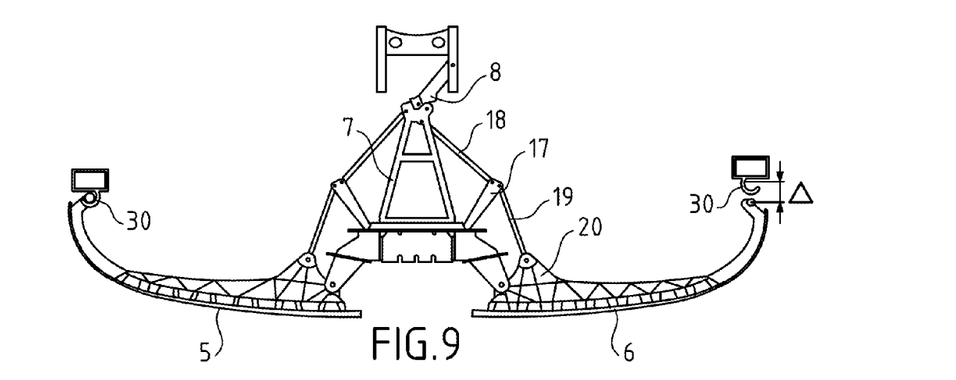
FIG. 9 is a simplified sectional view, along a plane perpendicular to the longitudinal axis of the aircraft, of an internal structure of an aircraft and illustrates a dissymmetry of closure between the two doors of a compartment for the retraction of main landing gears.

With reference to FIG. 9, when the two doors 5, 6 of the compartment 2 are in the closed position, they are each locked in this position by means of a hook 30 connected to the structure of the aircraft 1. Thus, from an open position, the doors 5, 6 pivot until one of the ends thereof interlocks with the hook 30. Due to problems relating to adjustment or deformation of the aircraft 1, it may be that only one of the two doors 5, 6 is actually in a closed position locked by the hook 30, whereas the other door 5, 6 is outside the hook 30 at a distance Δ therefrom. Two scenarios are then possible:

(i) either the two doors 5, 6 remain stuck in this position, which is an unacceptable situation insofar as only one of the two doors 5, 6 is locked in its position by the hook 30, the other being likely to open unexpectedly at any moment, (ii) or any force deployed by the actuation member 7, 8 continues to pass only via a single transmission chain. In this case such a force would be taken up only by a single transmission chain and would therefore be likely to deform the parts forming the chain.

Neither of the two impaired situations is desired. A means making it possible to prevent such situations from occurring is to be used for each transmission chain, i.e. a force-limiting means in the form of at least one resilient connecting rod 118, 119. In this way, as indicated in FIG. 10A, it is either the first connecting rod 118 connecting the relay arm 17 to the second end of the arm 7 that is made resilient, or, as indicated in FIG. 10B, it is the second connecting rod 119 connecting the relay arm 17 to the supporting part 20 of the door 5, 6 that is made resilient.

A resilient connecting rod 118, 119 for example may be present in the form of a system having a coaxial piston, comprising a jacket, a rod and a spring that forces the rod to the bottom of the jacket.

Figure 10A:
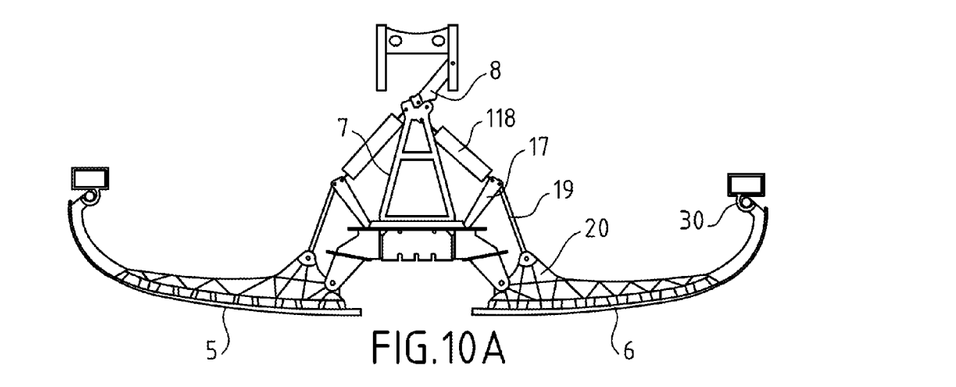
FIG. 10A is a simplified sectional view, along a plane perpendicular to the longitudinal axis of the aircraft, of the internal structure of FIG. 9, illustrating means making to eliminate the dissymmetry of closure between the two doors.

In the example illustrated in FIG. 10A, the jacket of the first resilient connecting rod 118 is connected to the relay arm 17, and the rod is connected to the arm 7 in the zone of intersection 16.

Figure 10B:
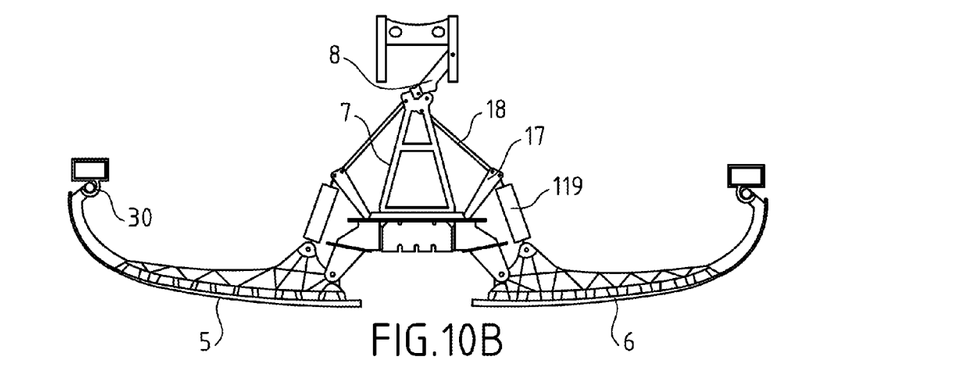
FIG. 10B is a simplified sectional view, along a plane perpendicular to the longitudinal axis of the aircraft, of the internal structure of FIG. 9, illustrating means to eliminate the dissymmetry of closure between the two doors.

In the example illustrated in FIG. 10B, the jacket of the second resilient connecting rod 119 is connected to the supporting part 20 of the door 5, 6, and the rod is connected to the relay arm 17.

For these two configurations, the radius of the spring is such that the spring and therefore the rod starts to move relative to the jacket only when the force applied to the rod by means of the part to which the rod is fixed is greater than the normal maneuvering force.

Thus, when one of the two doors 5, 6 is closed incorrectly, the use of a resilient connecting rod 118, 119 in the transmission chain allows a continuation of the kinematics for closing the door 5, 6 in order to bridge the distance Δ separating an end of this door 5, 6 from the locking hook 30.

Such a force-limiting means 118, 119 makes it possible to correctly close the two doors 5, 6 of the compartment 2 in any circumstance.

An aircraft according to the invention may have one or more of the following advantages:

(i) the mechanism for opening and closing the doors 5, 6 is symmetrical with respect to a longitudinal axis of the aircraft, because the transmission chains are placed on each side of the axis. In addition, the member for actuating the two doors 5, 6, the member being formed by the arm 7 and the actuating cylinder 8, also pivots in a longitudinal plane of the aircraft. This symmetry ensures the stability and reliability of the mechanism for actuating the two doors 5, 6 because the forces produced on the doors 5, 6 in order to open or close them are homogeneous and uniformly distributed, and (ii) the aircraft is of optimized size under all circumstances, because the doors 5, 6, whether in an open or closed position, never protrude from the skin of the aircraft 1.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

We claim:

1. An aircraft comprising a first door, a second door and a maneuvering system configured to move each door between an open position and a closed position, the maneuvering system comprising:

an actuation member comprising an arm mounted pivotably on a first structural element of the aircraft and an actuating cylinder mounted on a second structural element of the aircraft, wherein the actuating cylinder is configured to move the arm; and transmission chains or linkages each connecting one of the doors to the actuation member, wherein each transmission chain or linkage comprises:

a relay element mounted pivotably on the first structural element of the aircraft a first connection element between the arm and the relay element; and a second connection element between the respective door and the relay element.

2. The aircraft according to claim 1, wherein the actuating cylinder includes one of a pneumatic or hydraulic reservoir or electric motor, which extends and retracts the actuating cylinder to move the arm of the actuation member.

3. The aircraft according to claim 1, wherein the transmission chains or linkages are symmetrical about a longitudinal axis of the aircraft.

4. The aircraft according to claim 1, wherein the first and second doors are flush with a skin of the aircraft while in the closed position and are folded inside a compartment of the aircraft while in an open position.

5. The aircraft according to claim 1, wherein the first and second doors each pivot between the closed position and the open position.

6. The aircraft according to claim 1 wherein:
the actuating cylinder is pivotably mounted to the second structural element of the aircraft,
the arm and the actuating cylinder are connected by an articulated joint at a connection zone, and
each first connection element is connected to the arm at the connection zone.

7. The aircraft according to claim 1, wherein the first structural element is a lower platform of the aircraft and the second structural element is an upper platform of the aircraft.

8. The aircraft according to claim 6 wherein:
the arm has a first end mounted pivotably on the first structural element of the aircraft and the actuating cylinder has a first end mounted pivotably to the second structural element of the aircraft, and
a second end of the arm is connected by the articulated joint to a second end of the actuating cylinder at the connection zone.

9. The aircraft according to claim 8, wherein the first end of the arm is splayed and the second end of the arm is narrow.

10. The aircraft according to claim 9 wherein:
the arm includes non-parallel, longitudinal segments connected to one another by a transverse segment, and
at the first end, the longitudinal segments are at a maximum spacing form each other, and
at the second end, the longitudinal segments are at a minimal spacing from each other.

11. The aircraft according to claim 8, wherein the first end of the arm and the first end of the actuating cylinder are each mounted pivotably, respectively, on the first structural element and the second structural element of the aircraft about an axis of rotation that is parallel to a transverse axis of the aircraft, and in that the articulation of the connection zone is formed about an axis that is parallel to the transverse axis of the aircraft.

12. The aircraft according to claim 1, wherein the relay element is a rigid part, mounted pivotably about an axis that is parallel to a longitudinal axis of the aircraft, wherein the first connection element and the second connection element are each formed by a connecting rod.

13. The aircraft according to claim 1 wherein:
each of the doors is connected to a supporting part which is mounted pivotably on the first structural element of the aircraft to allow the door to pivot between the open position and the closed position, and
the second connection element connects the supporting part to the relay element.

14. The aircraft according to claim 1, wherein at least the first or the second connection element forms a force-limiting member for each transmission chain.

15. The aircraft according to claim 14, wherein the force-limiting member is a connecting rod.

16. The aircraft according to claim 15 wherein:
the connecting rod either connects the relay element to the arm or connects the relay element to a supporting part, and
the connecting rod comprises:
a jacket,
a rod that is positioned within the jacket, and
a spring biasing the rod toward a bottom of the jacket, wherein the rod is displaced along an axis of the jacket to maneuver the doors.

17. The aircraft according to claim 1, wherein the first door and the second door close a compartment of the aircraft configured to stow main landing gears.

18. The aircraft according claim 1, wherein the first door and the second door are separated by a fixed panel of the aircraft, wherein the doors are disposed in continuity with the fixed panel when in the closed position.

19. An aircraft comprising:
a fuselage having an outer skin and a compartment;
doors connected to the fuselage, wherein the doors have a closed position closing the compartment and contiguous with the outer skin and an open position at which the compartment is open through the outer skin;
a door maneuvering system comprising:
an arm pivotably mounted to a lower platform of the fuselage, wherein the arm pivots within a plane parallel to a longitudinal axis of the fuselage;
an actuating cylinder mounted to an upper platform of the fuselage and having an extendible end region connected to the arm, wherein the actuating cylinder extends to pivot the arm; and
a transmission chain or linkage for each door, wherein each transmission chain or linkage is connected to a respective one of the doors and to the arm, wherein each transmission chain or linkage comprises:
a relay arm with one end mounted pivotably to the lower platform of the fuselage and an opposite end coupled to a middle section of the transmission linkage.

20. The aircraft of claim 19 wherein the transmission chain or linkage for each door is symmetrical with the other transmission chain or linkage about the longitudinal axis.

21. The aircraft of claim 19, wherein the relay arm is mounted pivotably about an axis that is parallel to a longitudinal axis of the aircraft.

* * * * *